United States Patent [19]
Goldman et al.

[11] Patent Number: 5,423,025
[45] Date of Patent: Jun. 6, 1995

[54] ERROR HANDLING MECHANISM FOR A CONTROLLER HAVING A PLURALITY OF SERVERS

[75] Inventors: Gary S. Goldman; Kent W. Wendorf, both of San Jose, Calif.

[73] Assignee: Amdahl Corporation, Sunnyvale, Calif.

[21] Appl. No.: 953,737

[22] Filed: Sep. 29, 1992

[51] Int. Cl.$^6$ ............................................. G06F 11/34
[52] U.S. Cl. ................................................... 395/575
[58] Field of Search ............... 395/575, 425, 725, 650; 371/22.3, 22.4, 15.1

[56] References Cited

U.S. PATENT DOCUMENTS

| | | | |
|---|---|---|---|
| 4,604,746 | 8/1986 | Blum | 371/25 |
| 4,982,402 | 1/1991 | Beaven et al. | 371/12 |

Primary Examiner—Charles E. Atkinson
Assistant Examiner—Phung My Chung
Attorney, Agent, or Firm—Fliesler, Dubb, Meyer & Lovejoy

[57] ABSTRACT

An error handling and reporting mechanism is capable of taking advantage of sophisticated error analysis performed after clocks have been stopped in response to an error detected in a controller. The controller provides services in a data processing system in response to requests for controller services from a plurality of requestors. The controller includes a plurality of ports for storing requests for controller services. A plurality of servers is coupled to the plurality of ports, and perform separate services associated with the requests for controller services stored in the plurality of ports. An error reporting mechanism is included which is responsive to a detected error in a particular server associated with a request in a particular port, for posting error status in the particular port and causing clock stoppage within a clock stop latency period. An error analysis mechanism analyzes the detected errors during the clock stoppage. Error handling logic is coupled with the error analysis mechanism, and is responsive to the posted error status in the ports, for notifying a requestor of an error status posted with a request in the particular port. The error handling logic includes a stall counter, which stalls the error handling mechanism in response to the posted error status for at least the clock latency period so that the clock stoppage occurs and the error analysis mechanism completes error analysis before the requestor is notified.

17 Claims, 4 Drawing Sheets

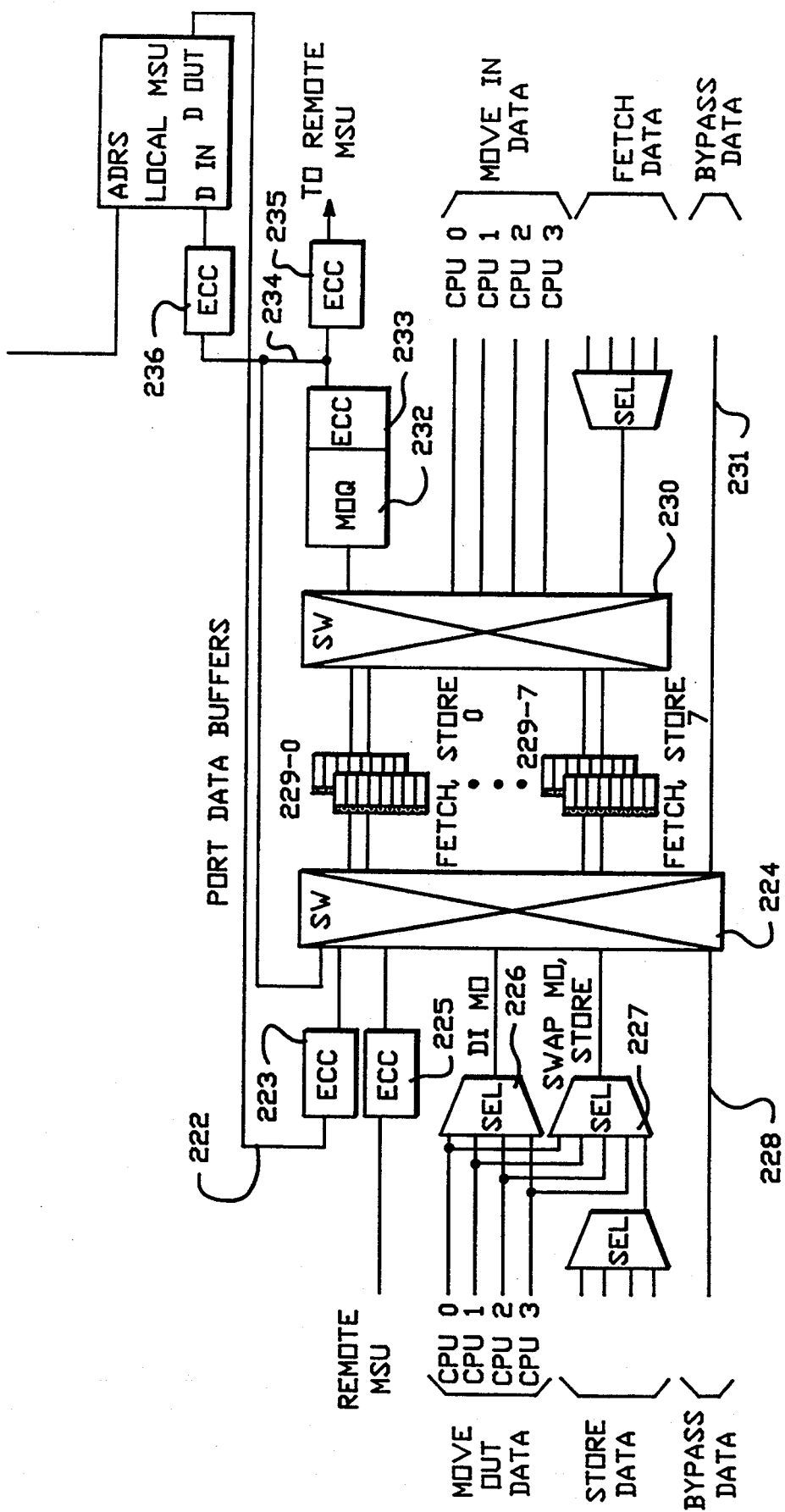
FIG.—3B

ERROR HANDLING MECHANISM FOR A CONTROLLER HAVING A PLURALITY OF SERVERS

BACKGROUND OF THE INVENTION

1. Field of the Invention

The present invention relates to mechanisms for handling and reporting errors in computer systems; and more particularly to a controller having a plurality of servers with a mechanism for handling errors occurring in the server, and reporting the errors back to the requestor of services of the controller.

2. Description of Belated Art

Large scale computer systems, such as those operating in accordance with the IBM ESA/390 architecture, include a plurality of central processing units sharing access to a mainstore. A system controller coordinates the transfer of data among the central processing unit and the mainstore. The system controller includes a plurality of servers, which independently work on a queue of requests or ports coupled to the processing units in the system, the mainstore, and other requestors in the data processing system.

When an error occurs in the system controller, the error must not only be processed for the purpose of correcting operations in the system controller, but the effect of the error must be reported back to the source of the request for service.

Thus, the error handling and reporting mechanisms in system controllers typically include a mechanism which associates an error with a specific port, and then reports the error to the requestor identified by that port. However, prior art mechanisms have been limited in the amount of information about the error that could be provided to the requestor through this mechanism.

It is desirable to provide an error handling and reporting mechanism for system controllers and other similar systems, which is enabled to take advantage of more sophisticated error analysis techniques.

SUMMARY OF THE INVENTION

The present invention provides an error handling and reporting mechanism which is capable of taking advantage of sophisticated error analysis performed after clocks have been stopped in response to an error detected in a controller. The mechanism provides a way for servers within the controller to detect and report errors, to minimize damage due to propagation of the error, to allow for software based assessment of the error, to report the error to the requestor, and to prepare for an expected retry of the request.

Accordingly, the present invention can be characterized as a controller providing services in a data processing system in response to requests for controller services from a plurality of requestors. The controller includes a plurality of ports for storing requests for controller services. A plurality of servers is coupled to the plurality of ports, and perform separate services associated with the requests for controller services stored in the plurality of ports. Error detection logic is coupled with the plurality of servers. An error reporting mechanism is included which is responsive to a detected error in a particular server, while the particular server is performing a service associated with a request in a particular port, for posting error status in the particular port and issuing a clock stop signal which results in clock stoppage within a clock stop latency period. An error analysis mechanism is coupled with the controller for analyzing the detected errors during the clock stoppage. Error handling logic is coupled with the error analysis mechanism, and is responsive to the posted error status in the ports, for notifying a requestor of an error status posted with a request in the particular port. The error handling logic includes a stall counter, which stalls the error handling mechanism in response to the posted error status for at least the clock stop latency period so that the clock stoppage occurs and the error analysis mechanism completes error analysis before the requestor is notified. During the clock stoppage, the error analysis mechanism may have an effect on the classification of the error which is reported with the error notification.

According to another aspect of the invention, the servers in the controller each include logic for holding service of a current request in response to a hold signal, by stopping and holding state machines at the next available stopping point. The error reporting mechanism issues a local hold signal to the holding logic in the particular server which suffers the error, and issues a global hold signal to the other servers in the controller. In this aspect, the stall counter is responsive to a first-in-time of the posted error status, the local hold signal, and the global hold signal. By beginning the stall counter on any of these three events, the error handling mechanism is insured that the clock stoppage will have occurred prior to the notification of the requestor of the error.

The error analysis mechanism in a preferred system is based on a scan facility which provides for access to controller state information by a service processor during the clock stoppage, which performs software error analysis. Also, the scan facility is coupled to the error handling mechanism for the purpose of affecting the classification of the error when the error notification is issued.

According to yet another aspect of the invention, the controller includes "flush" and "pinch" logic coupled to the plurality of ports, which are responsive to the global hold signal to "pinch" the interface to the plurality of ports so that no additional requests are accepted, until all pending requests have been flushed, or served. This has the effect of nominalizing the system controller in preparation for an expected retry of the request subject of the error. This increases the likelihood of a successful and quick retry.

The controller error handling and reporting mechanism of the present invention is particularly suited for application in a system controller in a large scale computer system which includes a plurality of processing units sharing access to a main storage system. In such system, the move in server is adapted for reading the plurality of ports, and notifying the requestor of port status information, and including requested data subject of a move in request. In this system, the error handling mechanism, including the stall counter, is coupled with the move in server.

The stall counter is necessary because the move in server may reach the affected port before or after the clock stoppage. If it reaches the effective port before clock stoppage, then the stall counter causes the move in server to wait for completion of the clock stoppage. If the port is detected after clock stoppage, the stall counter will simply expire, and the move in server will send off the error response message to the requestor.

Thus, as can be seen, the present invention provides an error handling and reporting mechanism which is capable of taking advantage of sophisticated software error analysis routines performed by the service processor.

Other aspects and advantages of the present invention can be seen upon review of the figures, the detailed description, and the claims which follow.

DESCRIPTION OF THE PREFERRED EMBODIMENTS

Figure 1:
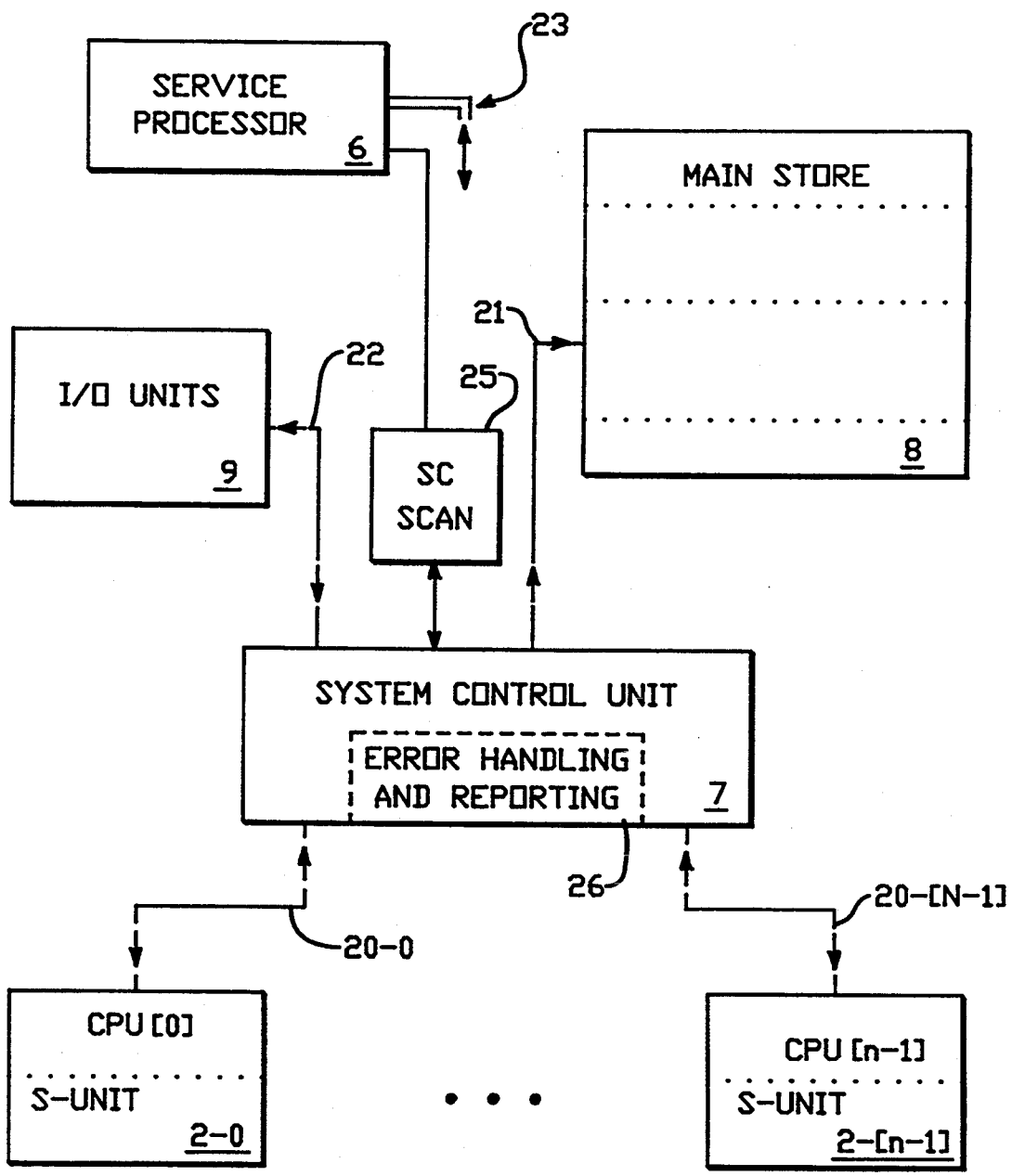
FIG. 1 depicts a block diagram of a multiple CPU computer system incorporating the present invention.
Figure 2:
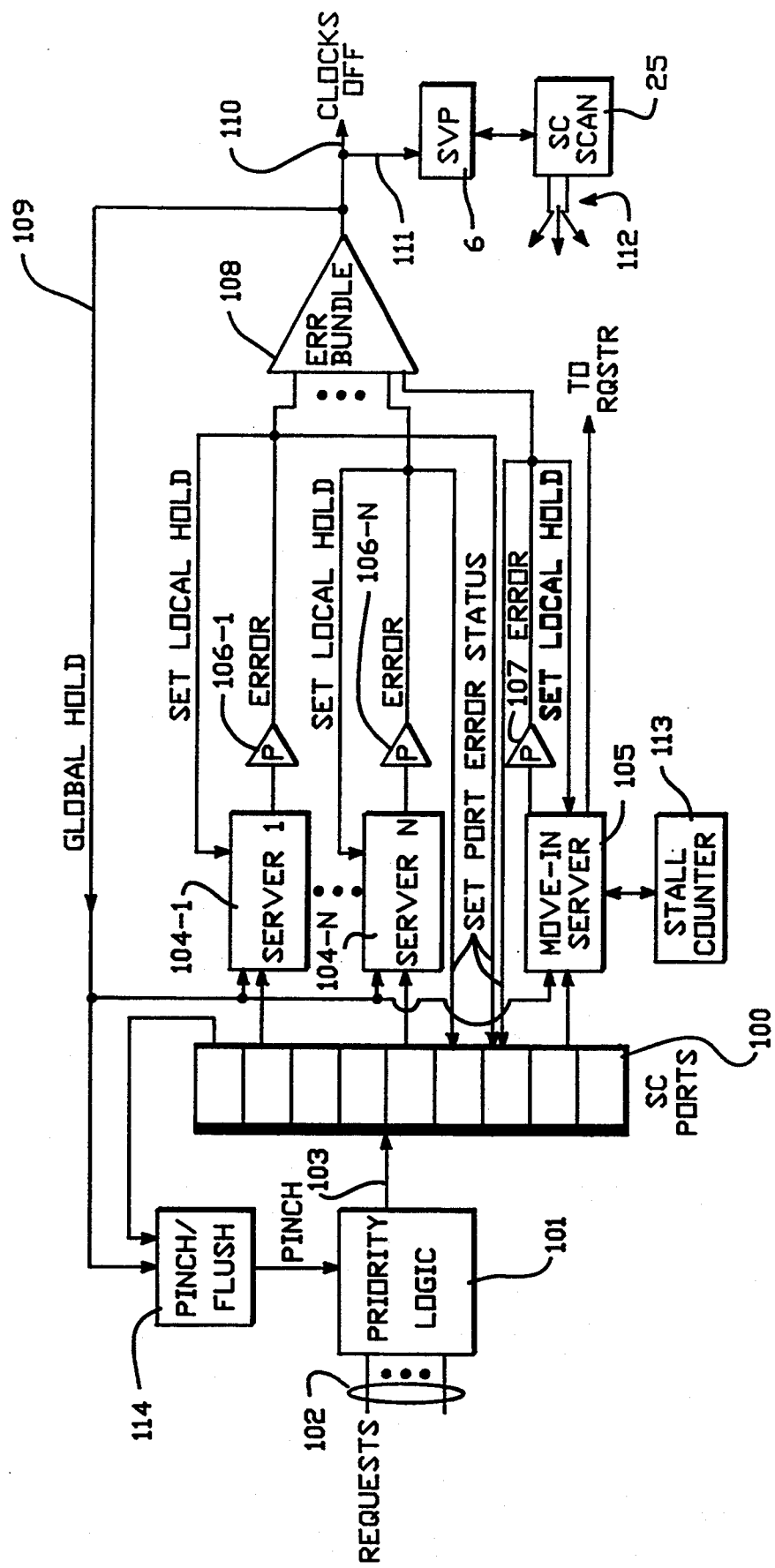
FIG. 2 is a schematic block diagram of a controller having an error handling and reporting mechanism according to the present invention.
Figure 3A:
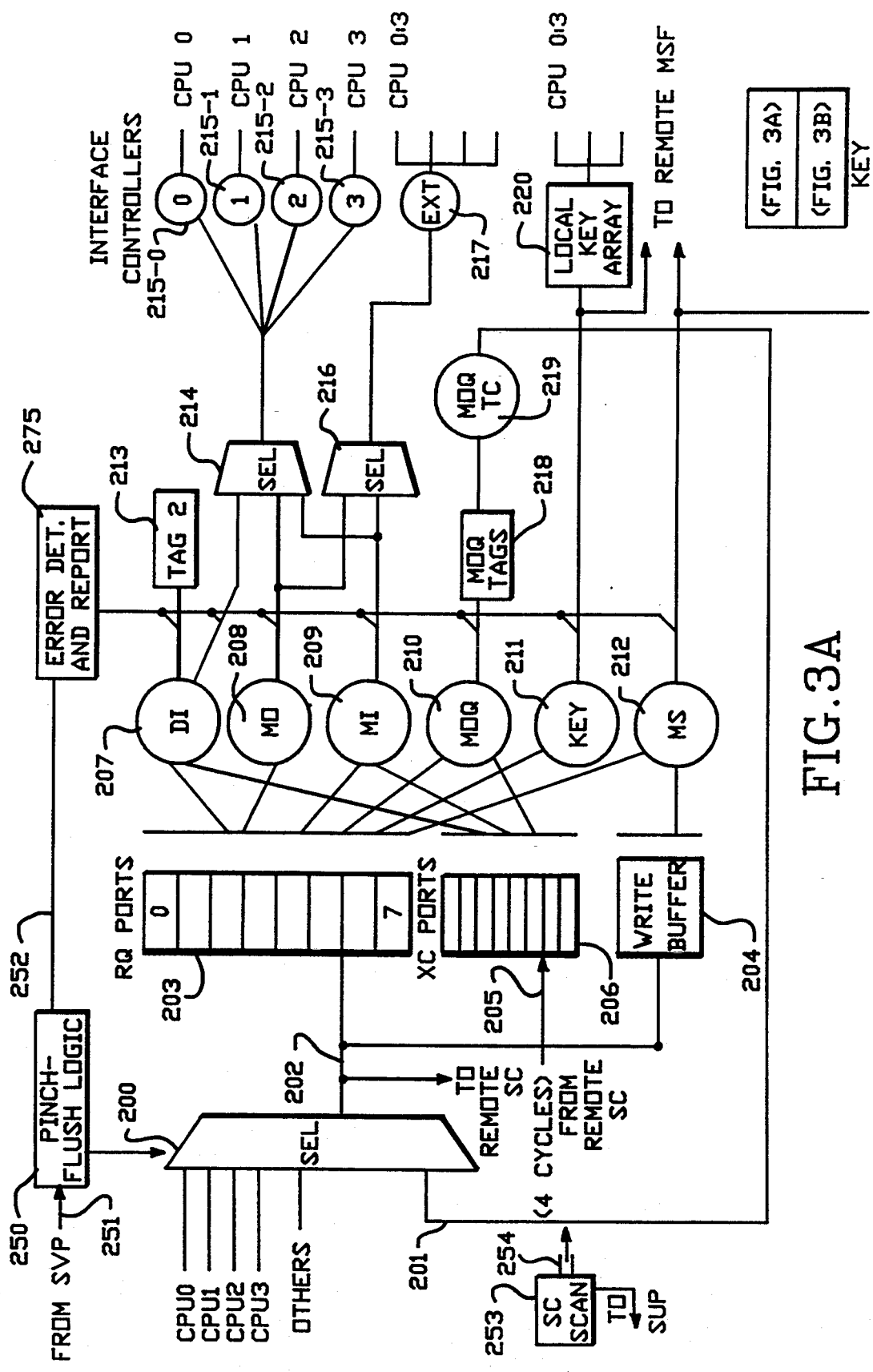
FIG. 3(A-B) is a functional block diagram of the system controller for a multi-CPU system according to the present invention.

A detailed description of a preferred embodiment of the present invention is provided with respect to the figures. FIG. 1 provides a computer system overview. FIG. 2 illustrates a preferred embodiment of the present invention. FIG. 3 sets out a more detailed description of the system controller according to the present invention.

FIG. 1 illustrates a multi-CPU computer system according to the present invention. The computer system includes a plurality of central processing units, each having a storage unit with a store-to cache. Thus, CPUs (0) through CPU (n−1) are given reference numbers 2-0 through 2-(n−1). Each of the CPUs is coupled to a system control unit 7 across interfaces 20-0 through 20-(n−1). The system control unit 7 also includes a mainstore interface 21. The system control unit 7 controls access to data among the CPUs and mainstore 8. Also coupled to the system control unit 7 through interface 22 are the input/output units 9. A service processor 6 is coupled to all of the functional units of the computer system, as indicated by arrows 23 through a scan interface or otherwise as known in the art. The system controller scan interface 25 is explicitly shown, and provides access to storage locations in the system control unit through a path separate from the normal operational path of the system control unit. Thus, the service processor 6 is able to scan data indicating the state of the computer system out of the computer system without using the normal control path. Also, the service processor is able to write data into specific service data locations within the functional units of the system.

As indicated in the figure, each of the CPUs, CPU-0 through CPU-n−1 includes an individual storage unit (S UNIT). Each storage unit includes an operand store-to cache and an instruction cache. Also, the storage unit is responsible for issuing requests for system controller services.

Also shown in the figure is error handling and reporting mechanism 26 within the system control unit 7. According to the present invention, the error handling and reporting mechanism 26 is capable of taking advantage of the sophisticated error analysis provided by the service processor 6 in handling and reporting errors which occur in system control unit 7.

FIG. 2 provides a detailed functional diagram of the error handling and reporting mechanism in the system controller 7. As can be seen, the system controller includes a plurality of ports 100 which store requests for services of the system controller. The plurality of ports are coupled to a priority logic 101 which receives the requests across lines 102 from the processing units in the system, the I/O processors, and other sources. Requests accepted by the priority logic 101 are supplied on line 103 to the plurality of system controller ports 100. The system controller ports include information about the request for service, including the requestor, op codes, and status information.

The system controller includes a plurality of servers, including server 104-1, through server N 104-N. Also included in the plurality of servers is a move in server 105. An error detection mechanism, such as parity checkers 106-1 through 106-n, and 107, is coupled with the plurality of servers. The error detection mechanism includes logic for reporting the error including a signal to set port error status in the port subject of the request, a set local hold signal which is coupled back to the respective server which suffered the error, and an error signal which is coupled to error bundling logic 108. The error bundling logic 108 includes latches for storing error history, and other error analysis logic as may be suited to a particular design. The error bundling logic 108 also generates a global hold signal on line 109 and a clocks off signal on line 110 which results in clock stoppage within a clock stop latency period. The clock stop latency in a large scale computer system may be from 10 to 20 cycles.

The error signal also is coupled across line 111 to the service processor 6. This signal may be propagated through the scan interface or otherwise as known in the art. The system controllers scan facility 25 is coupled to all of the elements in the system controller, as indicated by lines 112, as well as to the service processor.

Each of the servers 104-1, . . . , 104-n, 105, includes local hold logic which is responsive to a local hold signal or the global hold signal to stop and hold state machines within the server at the next available stopping point. This preserves machine state for logout and analysis.

A stall counter 113 is coupled to the move in server 105. The stall counter is responsive to a first-in-time of port error status detected by the move in server 105, a set local hold in the move in server, or a global hold signal on line 109, to stall execution of the move in server for at least a number of clock cycles equal to the clock stop latency.

The mechanism further includes pinch/flush logic 114 which is connected to the global hold signal 109 and to the plurality of SC ports 100. The pinch/flush logic is responsive to a global hold signal to "pinch" the arbitration logic 101 so that it does not accept any additional requests, until the ports 100 have been flushed by completion of the pending requests. Thus, when the clocks are turned back on after a clock stoppage, all of the pending requests in the SC ports 100 are completed before new requests are accepted through the arbitration logic 101.

Thus, when a server detects an error while processing a request, it reports the error in the following manner:

1. The error sets error history latches and the like in the error bundling logic 108, which will turn system clocks off. There is some latency in getting the clocks to stop, in a large scale computer system, this latency can be in the range of 10 to 20 cycles.

2. The server suffering the error initiates a local hold, in which it will stop and hold its state machines at the next available stopping point. This preserves state machine state for log out and analysis.
3. As a result of setting error history in the error bundling logic 108, the server engages a global hold signal for the system controller, which instructs all other servers to stop and hold at their next available stopping points.
4. The global hold mechanism also initiates a pinch and flush procedure through logic 114. The pinch immediately prevents arbitration logic 101 from accepting any new requests during the clock stop latency. This reduces the risk of exposing the additional request to the error prior to repair.

The flush is performed by keeping the pinch active after the clocks are turned back on, until all of the SC ports 100 have been serviced. This has the effect of nominalizing the system controller prior to any retry. By clearing out any and all ports 100 that may have been affected by the error prior to retry, the retry request will see a clean slate in the system controller, which should guarantee nominal timing for the request. This nominal timing may enhance retry success for timing or data pattern dependent errors. Also, a clear demarcation in time between potentially affected, pending requests and new requests is provided.

5. The detecting server will typically abort the request, and will post error status to the SC ports 100. This informs other servers which have not yet serviced the subject port, that they too should abort the request. Those servers will attempt not to detect the same error themselves.
6. The move in server collects status from the ports and sends responses, such as desired data, back to the requestor. In case of error status, the move in server 105 prepares and sends an error response to the requestor. The error response is accomplished as follows:
   a. Upon seeing error status, the move in server first fires up its stall counter 113. This counter forces the move in server to pause before sending an error response for at least long enough to allow clocks to go off. That is, the stall count is at least as large as the clock stop latency.
   b. During the clock stoppage, a service processor based software algorithm will inspect error history information in error bundling logic 108 and other machine state information for each port with error status set through the scan facility 25. It will then set up the appropriate error response codes in the affected port or ports so that the error analysis routine in the service processor has an affect on the classification of the error for the response message. The hardware provides a default response, indicating that the request has been successfully aborted and should be retried. The service processor algorithm may alter this response to indicate a non-retriable error, that the error status should be ignored, or that no response should be sent at all.
   c. The move in server finally sends the error response after the service processor has completed processing, the clocks have been turned on, and the stall counter expired. It is up to the requestor to retry the failing request and/or to otherwise process the error.

Thus, the error handling mechanism includes hardware to provide local and global hold states following detection of an error by a server. Also, the pinch and flush logic 114 for nominalizing the system controller prior to accepting any retry request is included. Port error status, or other status information is used to formulate an error response to the requestor coupled to the scan facility for updating by the service processor. The stall counter mechanism in the move in server ensures that the response is made only after the service processor has had an opportunity to affect the port error status. Software in the service processor executes during clock stoppage to analyze any port error status information and alter the default error response as needed. The analysis performed by the service processor is addressed to any and all ports in the system controller.

The stall counter forces the error handling server to wait before sending an error response to the requestor, in case the form of the error response should be updated by the service processor software. The hardware default is to send a "retriable" error response. In some cases, the software may choose to send a "non-retriable" error or send a normal completion response, or even send no response at all. The software can update the error response, but only when the system clocks are stopped because it is accomplished through the scan facility.

Note also that the ports include information concerning the type of request stored in the port which is necessary for composing a proper error classification. This information is accessible by the service processor as well and is reported back in addition to the retriable or non-retriable status of the error.

FIG. 8 illustrates a more detailed functional block diagram of the system controller according to the present invention. The system controller includes a system for controlling access to data among the OPUs and other portions of the system, such as the service processor, the main storage unit, I/O processors, and the like. Thus, it includes an input priority logic 200 which receives requests from OPU 0 through OPU n (n=3 in the embodiment of FIG. 3). Other requestors to the system controller are also supplied as inputs to the priority logic 200, such as the service processor, I/O processors, and the like. Also, a move out queue bus 201 is supplied as an input to the priority logic 200. The output of the priority logic 200 is supplied on line 202 to the request ports 203 and to a write buffer 204. A remote system controller (in a system including a plurality of system controllers) is also coupled through line 205 to cross coupled request ports 206.

The request ports 203 and 206 are coupled to a plurality of servers, including a data integrity server 207, a move out server 208, a move in server 209, a move out queue server 210, a key server 211, and a mainstore server 212. The remote system controller has access only to the data integrity server 207, move in server 209, and move out queue server 210. The write buffer 204 has access only to the mainstore server 212 and is dedicated for writes to mainstore. The move in server 209 includes the stall counter and other features described with reference to FIG. 2. Note that error status in the write buffer is handled and reported through a different mechanism. The data integrity server 207 is coupled to the TAG2 logic 213. The TAG2 logic includes copies of the tags from all of the storage units for the CPUs of the system. Thus, data integrity and cache consistency operations are carried out using the data integrity server 207 and the TAG2 logic 213. Requests for data from the data integrity server 207, move out server 208, and move in server 209, are supplied through selector 214 to the interface controllers for each of the CPUs 215-0 through 215-3. Also, requests from move out server 208 and move in server 209 are supplied through selector 216 through a cross-coupled interface controller 217 to the CPUs and other requestors in the system, such as service processors, I/O processors, and the like.

The move out queue server 210 is coupled to the move out queue tags 218 and the move out queue controller 219. The output of the move out queue controller 219 is supplied on line 201 to the select logic 200.

The key server 211 drives local key array 220 and is coupled to a remote mainstore facility. The local key array 220 is used to provide storage keys to the CPUs and other requestors in the system.

The mainstore server 212 supplies addresses to the local mainstore unit 221, and to a remote mainstore facility if present in the system.

The data paths for the system controller are shown in the bottom half of the figure. The output of the local mainstore unit is supplied on line 222 to ECC logic 223. The output of the ECC logic 223 is supplied to a switch 224. Other inputs to the switch 224 include the output of ECC logic 225 which is supplied from the remote mainstore unit, the output of the selector 226 which is used to supply data integrity move out data from the CPUs, and output of the selector 227 which is used to supply swap move out data from the CPUs in the system and store data from the various units in the system. Finally, the switch 224 receives bypass data across line 228. The output of the switch 224 supplied to the fetch and store buffers 229-0 through 229-7. The data in the fetch and store buffers is supplied through switch 230. The switch 224 also supplies bypass path 231.

The output of the switch 230 supplies move out queue buffers 232 with associated ECC logic 233, the move in data paths to the respective CPUs, and the fetch data paths to the variety of fetch data requestors. The output of the move out queue ECC logic 233 is supplied on line 234 through error checking correcting logic 235 to the remote mainstore unit, and through ECC logic 236 to the local mainstore unit. Also, the data on line 234 is supplied as an input to the switch 224.

FIG. 3 also illustrates the server error detection and reporting logic 275 and the pinch-flush logic 250 which is coupled to the logic 275 across lines 252, and receives commands from the service processor across line 251. The pinch-flush logic 250 controls the interface 200 to flush the system controller in the event of a malfunctioning CPU as described above with respect to FIG. 2.

Also shown in FIG. 3 is a system controller scan facility 253, which is coupled to storage locations including the port error status registers and others throughout the system controller across lines 254.

As can be seen, the present invention provides an error handling server that uses a stall counter to ensure that the service processor has the opportunity to perform sophisticated error analysis routines, prior to notifying the requestor of the error and its classification.

The error handling server starts the stall counter in three cases. First, the stall counter is started when any error is detected in the system controller in response to the global hold signal. The server may or may not be operating on the damaged port at the time of the error, or more than one port may be damaged. By stalling the error handling server as soon as any error is detected, the code in the service processor has a better chance at repairing and isolating the damage.

Second, the stall counter is started when the error handling server sees that its current operation has port error status set. This indicates that his particular port had been damaged by an error. This damaged port may be processed by the server either before or after the clocks are stopped before the initial error, which resulted in the port error status bit being asserted. If encountered before the clocks stop, the service processor can update the error responses above. However, if the error is accounted after the clocks have stopped, and restarted, the server continues without waiting for the service processor software, because such software has already had an opportunity to affect the error status information in the port.

Finally, the stall counter is started when the error handling server detects an error in its current operation. In the embodiment described above, the move in server provides the error handling service. It attempts to suppress the operation suffering the error and start the stall counter.

Since the error handling server cannot determine whether clocks have already stopped in response to the first instance of the error, particularly in the case where the stall counter is initiated because of port error status, it stalls for no less than the clock stop latency of the system. For example, if it takes 25 cycles from the initial detection of an error until clocks stop, the counter value must be greater than 25. If no clock stop is forthcoming when the counter is started, the stall count will expire and the move in server will continue without hanging.

Accordingly, the present invention provides a mechanism which enables sophisticated error analysis routines to be executed in response to errors in a system controller. This enables efficient error handling by the central processing units or other elements of the system which had requested services from the system controller.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A controller providing services in a data processing system in response to requests for controller services from a plurality of requestors, comprising:
   a plurality of ports for storing requests for controller services;
   a plurality of servers, coupled to the plurality of ports, performing services associated with the requests for controller services stored in the plurality of ports;
   error detecting means, coupled with the plurality of servers, for detecting errors in respective servers;
   error reporting means, coupled to the error detecting means and responsive to a detected error in a particular server in the plurality of servers, while the particular server is performing a service associated with a request in a particular port in the plurality of ports, for posting error status in the particular port and issuing a clock stop signal which results in clock stoppage within a clock stop latency period;

error analysis data means, coupled with the plurality of servers, for providing error data for analysis after clock stoppage; and error handling means, coupled with the error analysis data means and with the plurality of ports and responsive to posted error status, for notifying a requestor of an error status posted with a request in the particular port, said error handling means including a stall counter for stalling notification to a requestor in response to the posted error status until clock stoppage occurs and error analysis of the error data supplied by the error analysis data means has been completed.

2. The controller of claim 1, wherein the error handling means is coupled with one of the plurality of servers.

3. The controller of claim 2, wherein the stall counter is further responsive to detection of an error in the one server coupled with the error handling means.

4. The controller of claim 1, wherein a subset of the servers in the plurality of servers includes logic for holding service of a current request in response to a hold signal; and the error reporting means includes means coupled to respective servers of the subset for issuing a local hold signal to the logic for holding in the respective server of the subset, and issuing a global hold signal to the logic for holding in other servers of the subset.

5. The controller of claim 4, wherein the stall counter is responsive to a first occurrence of either the posted error status, the local hold signal or the global hold signal.

6. The controller of claim 1, wherein the error analysis data means includes a scan facility for providing controller state information during the clock stoppage to a service processor for performing error analysis.

7. The controller of claim 6, wherein the error reporting means further includes means for classifying the error for the requestor, and the scan facility provides access to the means for classifying so that the service processor may affect the classification.

8. A system controller performing data transfer services in a data processing system in response to requests from a plurality of requestors, comprising:

a plurality of ports for storing requests for data transfer services;

a plurality of servers, coupled to the plurality of ports, performing data transfer services associated with the requests stored in the plurality of ports;

error detecting means, coupled with the plurality of servers, for detecting errors in respective servers;

error reporting means, coupled to the error detecting means and responsive to a detected error in a particular server in the plurality of servers performing a service associated with a request in a particular port in the plurality of ports, for posting error status in the particular port and issuing a clock stop signal which results in clock stoppage within a clock stop latency period;

a scan facility, coupled to the plurality of servers, for providing controller state information to a service processor during the clock stoppage for performing error analysis by the service processor; and error handling means, coupled with the scan facility and with the plurality of ports and responsive to posted error status, for notifying a requestor of an error status posted with a request in the particular port, said error handling means including a stall counter for stalling notification to a requestor in response to the posted error status until clock stoppage occurs and error analysis is completed by the service processor.

9. The controller of claim 8, wherein the error reporting means further includes means for classifying the error for the requestor, and the scan facility provides access to the means for classifying so that a service processor may affect the classification.

10. The controller of claim 8, wherein the plurality of servers include a move in server for responding to requests from a requestor of the plurality of requestors to move data, and the error handling means is coupled with the move in server.

11. The controller of claim 8, wherein a subset of the servers in the plurality of servers includes logic for holding service of a current request in response to a hold signal; and the error reporting means includes means coupled to respective servers of the subset for issuing a local hold signal to the logic for holding in the respective server in said subset, and issuing a global hold signal to the logic for holding in other servers of the subset.

12. The controller of claim 11, wherein the stall counter is responsive to a first occurrence of either the posted error status, the local hold signal or the global hold signal.

13. The controller of claim 11, further including:
logic responsive to the global hold signal and coupled to the plurality of ports for disabling the plurality of ports from accepting requests until all requests pending at the time of the global hold have been serviced.

14. A system controller performing data transfer services in a data processing system in response to requests from a plurality of requestors, comprising:

a request queue coupled to the plurality of requestors, including a plurality of ports for storing requests for data transfer services;

a plurality of servers, coupled to the plurality of ports, performing data transfer services associated with the requests stored in the plurality of ports, the plurality of servers including logic for holding service of a current request in response to a hold signal;

error detecting means, coupled with the plurality of servers, for detecting errors in respective servers;

error reporting means, coupled to the error detecting means and responsive to a detected error in a particular server in the plurality of servers performing a service associated with a request in a particular port in the plurality of ports, for posting error status in the particular port, for issuing a local hold signal to the logic for holding in the particular server, for issuing a global hold signal to the logic for holding in other servers in the plurality of servers, and for issuing a clock stop signal which results in clock stoppage within a clock stop latency period;

a scan facility, coupled to the plurality of servers, for providing controller state information during the clock stoppage to a service processor for performing error analysis by the service processor; and error handling means, coupled with the scan facility and with the plurality of ports and responsive to posted error status, for notifying a requestor of an error status posted with a request in the particular port, including a stall counter for stalling notification to a requestor in response to a first occurrence of either the posted error status, the local hold signal or the global hold signal until clock stoppage and error analysis is completed by the service processor.

15. The controller of claim 14, wherein the error reporting means further includes means for classifying the error for the requestor, and the scan facility provides access to the means for classifying so that a service processor may affect the classification.

16. The controller of claim 14, further including:

logic responsive to the global hold signal and coupled to the plurality of ports for disabling the plurality of ports from accepting requests until all requests pending at the time of the global hold have been serviced.

17. The controller of claim 14, wherein the plurality of servers include a move in server for responding to requests by the plurality of processing units to move data in to a requesting processing unit, and the error handling means is coupled with the move in server.

* * * * *